March 6, 1945.  H. B. LEWIS  2,370,866
INDUSTRIAL TRUCK
Filed July 5, 1943

INVENTOR
HOWARD B. LEWIS
BY
HARRIS, KIECH, FOSTER & HARRIS
Ferd W Lewis
FOR THE FIRM
ATTORNEYS.

Patented Mar. 6, 1945

2,370,866

UNITED STATES PATENT OFFICE 2,370,866

INDUSTRIAL TRUCK

Howard B. Lewis, Venice, Calif., assignor to Salsbury Corporation, Los Angeles, Calif., a corporation of California Application July 5, 1943, Serial No. 493,526

3 Claims. (Cl. 180—13)

My invention relates to industrial trucks such as are used for transporting materials in workshops and factories. Such trucks have typically a platform about six to twelve inches above the floor and are sufficiently narrow to pass through aisles three feet, or more, wide.

My invention could be applied to vehicles other than industrial trucks, and its application to an industrial truck is described herein merely to illustrate one use of the invention.

My invention is, however, limited to power operated vehicles, and the principal object of my invention is to provide a traction means for such a vehicle, that is, a means provided with an engine and used for pushing and pulling the vehicle. In the practical use of my invention, I prefer to use an internal combustion engine, but an electric motor driven by a storage battery could be used, and the term "engine" as used herein should be understood to mean any sort of prime mover.

The principal object of my invention is to provide an industrial truck or other vehicle that can be readily maneuvered so that it can be readily used in workshops, factories, and other locations where space is limited. I prefer to use as a driving means a turret such as is shown in the application of Lewis D. Thostenson, Serial No. 482,865, filed April 13, 1943, which is powered by an internal combustion engine which drives a single driving wheel through a mechanism such as disclosed in Patent No. 2,260,798, issued October 28, 1941, to Salsbury Corporation as assignee of Bruce Burns.

In the Thostenson application an industrial truck is shown having two free-running rear wheels and a single front driving wheel which can be turned about a vertical axis to pull or push in any direction in a horizontal plane, the load being supported on these three wheels.

It is a further object of my invention to provide a similar vehicle in which the load is wholly supported on three or more free-running wheels, one or more of which are castered so that they can turn about vertical pivots, and to thus be able to use the single driving wheel only to obtain traction, none of the weight of the truck proper or its load being carried on the driving wheel. In practice, I use four free-running wheels, the two forward wheels being castered. By providing four wheels, each near one corner of a rectangular platform, I provide a truck having more lateral stability than is possible in a three-wheel truck.

It is a further object of my invention to provide means which enables the driving wheel to move up or down with relation to the truck body so that the driving wheel will at all times be in contact with the floor or pavement on which the truck rests, the weight of the turret being at all times carried on the driving wheel, thus assuring adequate traction.

Further objects and advantages will be made evident hereinafter.

Referring to the drawing, which illustrates how my invention may be applied to an industrial truck:

Figure 1:
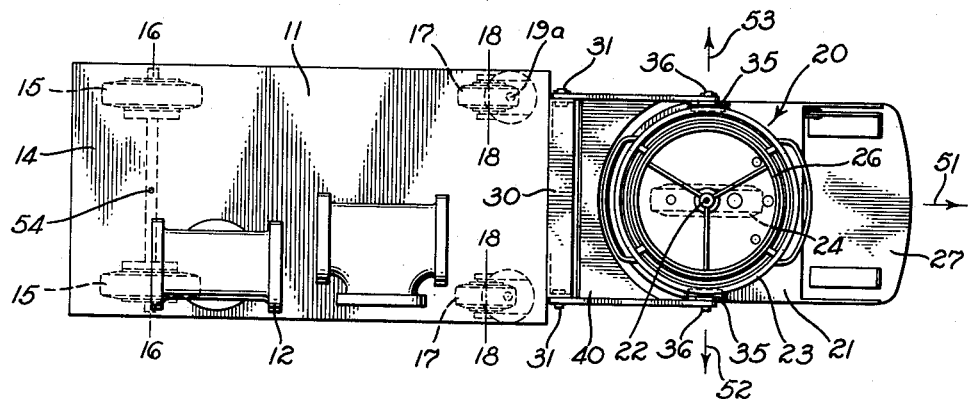
Fig. 1 is a plan view of such a truck.

In the truck shown in the drawing, 11 is a truck body adapted to carry a load 12. The rear end 14 of the truck is supported on two rear wheels 15 which turn freely about a common axis 16. The terms "front" and "rear" as used herein are merely for identification, as the truck can be driven to either the right, or forward, as seen in the drawing, or to the left, or backward. The forward end of the truck body is preferably supported on two castered wheels 17. The wheels 17 turn freely about axes 18 which are carried in members 19, each of which members can turn in relation to the truck body about a vertical axis 19a. The general design of such truck body and supporting wheels is more or less conventional, and such trucks equipped with handles by which they can be dragged about by workmen are now in very general use. Being supported on all four corners, the truck body is very stable so the load 12 need not be centered on the body.

My invention resides in the manner in which a power turret, such as is shown by Thostenson, mentioned above, is applied to such a conventional truck or other vehicle.

The driving means is carried in a structure which I have called a "turret" 20, which is generally, but need not necessarily be, cylindrical. The turret 20 is free to be turned in a horizontal plane inside a turret support 21. The word "support" should not be misunderstood, as, in fact, the turret support 21 encircles and is supported by the turret 20 which can be turned inside the turret support by the operator of the vehicle, the turret turning freely about a vertical axis 22, a continuous hand-wheel 23 being provided on the turret 20 by means of which the operator of the vehicle can turn the turret. Inside the turret 20 is an engine having suitable mechanism for driving a driving wheel 24. A fuel tank, not shown, for the engine may also be carried inside the turret 20. Suitable means 26 are provided on the top of the turret 20 for controlling the operation of the engine.

The turret assembly shown in the Thostenson application may be used with or without the mechanism shown in the Burns patent. Neither the turret nor the mechanism is my invention. Means must be provided for mounting the front wheel 24 so that it can be turned by the operator to pull in any horizontal direction and for driving the wheel 24 from any convenient source of power carried by the turret 20. By placing the machanism entirely within the turret 20, the driving means and wheel 24 may be rotated freely about the axis 22.

The operator of the vehicle can stand on a forward extension 27 of the turret support 21 so that his weight, as well as the weight of the turret 20 and its engine and mechanism, is carried on the wheel 24.

I provide a dashboard 30 or other convenient structure which extends upwardly from the body of the truck. On each side of the dashboard 30, I provide upper body pivot pins 31 and lower body pivot pins 33 separated by a distance 32. The turret support 21 also has an upward extension 35 on either side thereof, and each carries an upper turret pivot pin 36 and a lower turret pivot pin 37 which should preferably be separated by a distance substantially equal to the distance 32. Pivoted respectively at one end on the two upper pins 31 at either side of the dashboard 30 and at the other end on the two upper pins 36 on the extensions 35 are two upper linkages 40. Pivoted respectively at one end on the two lower pins 33 on the dashboard 30 and at the other end on the two lower pins 37 on either side of the turret support 21 are two lower linkages 41. The distance between the holes in the ends of the upper linkages 40 should be about the same as the distance between the holes in the ends of the lower linkages 41.

Figure 2:
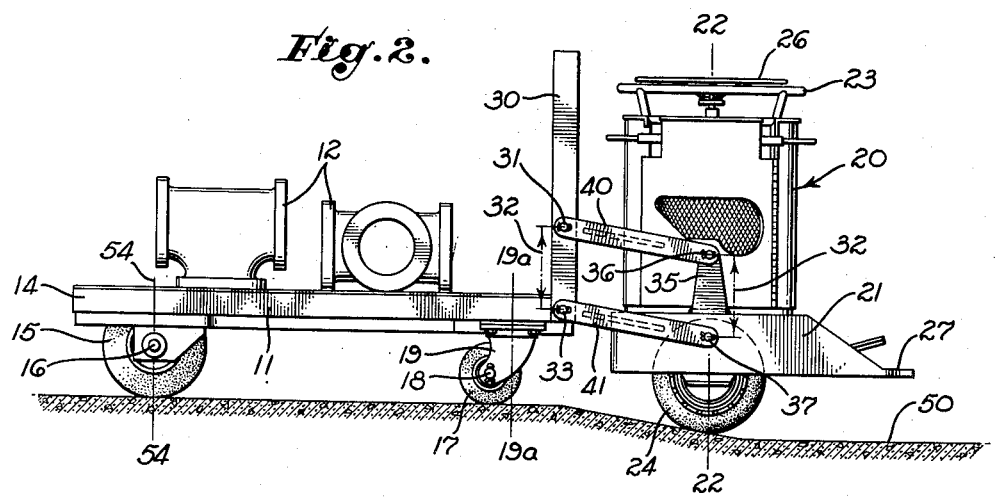
Fig. 2 is a side elevation.
Figure 3:
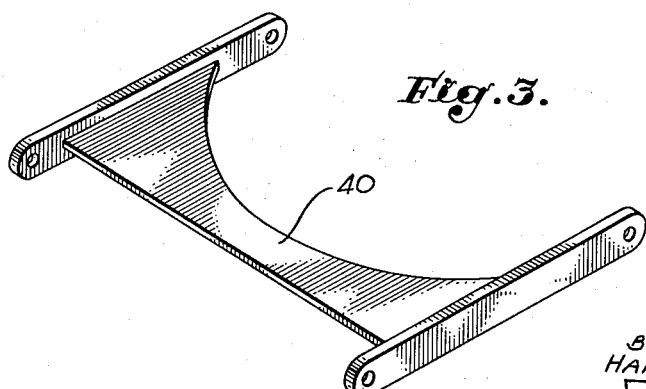
Fig. 3 is an isometric view of the linkages used.

The linkages 40 and 41 act as parallel motion directors so that if the top of the body 11 is horizontal, the axis 22 is substantially vertical regardless of the vertical position of the wheel 24. This allows the wheel 24 to move up and down to suit irregularities in the floor or pavement 50 on which the truck operates. Since the turret 20 and the driving wheel 24 can be turned into any angular position about the axis 22, the wheel can force the front of the truck in any direction. As shown in the drawing, if the wheel is assumed to be driven in a clockwise direction as viewed in Fig. 2, the truck is pulled forward in the direction of the arrow 51 of Fig. 1. If as viewed in Fig. 1, the turret is turned in a clockwise direction about its axis 22 through an angle of 90°, the front end of the truck is pulled in the general direction of the arrow 52. If the turret is further turned in a clockwise direction through a further angle of 90°, the truck is driven backwardly in a direction opposite to the arrow 51, and further turning of the turret causes the front end of the truck to be pulled in the direction 53. The front end of the truck can therefore be driven in any direction radial to the axis 22. This gives the operator full control of the front end of the truck, and the truck can be turned in a very small space, turning, for example, about the axis 54. The rear end of the truck can be pushed into and pulled out of almost any space that is wider than the truck and allows the truck to be turned around in a space slightly wider than the length of the truck. This allows the truck to be used in the narrow aisles and spaces between machines found in many workshops and factories.

By the use of the parallel motion insured by the linkages 40 and 41, I ensure that the wheel exerts full traction as the weight of the turret 20, the turret support 21, and the operator is always carried solely by the wheel 24, which is free to assume any vertical position, within the limits imposed by the linkages, which is necessary due to changes in floor level or irregularities of a pavement. By using four wheels under the truck body proper, a very stable body is provided, which is necessary if heavy castings, or the like, are to be transported, as workmen are inclined to place them on the edges of the truck.

By placing the engine and all its parts, including the fuel tank, inside the turret and placing the controls for the engine on top of the turret, there need be no connection other than an antifriction bearing between the turret and the rest of the truck. The turret 20 can therefore be turned through any angle or, in fact, rotated repeatedly in the turret support 21.

I claim as my invention:

1. In a vehicle, the combination of: a load-carrying body; wheels for supporting said body and any load carried thereon; a driving wheel; an engine; mechanism through which said engine drives said driving wheel; a turret in which said engine, mechanism, and wheel are mounted, said turret being supported on said driving wheel; a turret support inside which said turret can turn freely about a vertical axis, said turret and the parts carried thereby being self-contained so that said turret can rotate freely and continuously about its vertical axis without restraint from other fixed parts of the vehicle; an upper linkage member pivoted at one end on said body and at the other end on said turret support; and a lower linkage member pivoted at one end on said body and at the other end on said turret support to allow the driving wheel to contact the surface upon which the vehicle moves regardless of considerable variations of said surface from a true plane.

2. In a vehicle, the combination of: a load-carrying body; wheels for supporting said body and any load carried thereon; a driving wheel; an engine; mechanism through which said engine drives said driving wheel; a turret in which said engine, mechanism, and wheel are mounted, said turret being supported on said driving wheel; a turret support inside which said turret can turn freely about a vertical axis, said turret and the parts carried thereby being self-contained so that said turret can rotate freely and continuously about its vertical axis without restraint from other fixed parts of the vehicle; an upper linkage member pivoted at one end on said body and at the other end on said turret support; and a lower linkage member pivoted at one end on said body and at the other end on said turret support to allow the driving wheel to contact the surface upon which the vehicle moves regardless of considerable variations of said surface from a true plane, the distance between the pivotal axes of said linkage on said body being substantially the same as the distance between the pivotal axes of said linkage on said turret support, and the distance between the two pivotal axes of the upper linkage being substantially the same as the distance between the pivotal axes of said lower linkage.

3. A vehicle comprising: a truck body having load supporting wheels turning about an axle having a fixed position with relation to said truck body; auxiliary castered supporting means for the body, each of said castered means being free to rotate about a vertical axis through one or more complete revolutions without other restraint than that imposed by the action thereon of the support on which the vehicle rests, the weight of the body and its load being carried wholly on said wheels and auxiliary castered supporting means; a turret support; a driving wheel; a turret supported on said driving wheel; means for driving said driving wheel, said turret and the parts carried thereby being self-contained so that said turret can rotate freely and continuously about its vertical axis without restraint from other fixed parts of the vehicle; two upper links disposed on either side of said body and said turret support, each of said upper links being pivoted at one end on an upper horizontal pivot carried by said body and at the other end on an upper horizontal pivot carried by said turret support; and two lower links disposed on each side of said body and said turret support, each of said lower links being pivoted at one end on a lower horizontal pivot carried on said body and at its other end on a lower horizontal pivot carried on said turret support, all of said upper and lower links having the same length from pivot center to pivot center, and each of said lower horizontal pivots being equally spaced from its corresponding upper pivot and on a vertical line passing through both of said pivots.

HOWARD B. LEWIS.